(12) United States Patent
Kurokawa et al.

(10) Patent No.: US 11,214,681 B2
(45) Date of Patent: Jan. 4, 2022

(54) FLAME-RETARDANT POLYCARBONATE RESIN COMPOSITION, SHEET AND FILM USING SAME, AND MANUFACTURING METHOD FOR EACH

(71) Applicants: MITSUBISHI GAS CHEMICAL COMPANY, INC., Tokyo (JP); MGC FILSHEET CO., LTD., Saitama (JP)

(72) Inventors: Haruhiko Kurokawa, Kanagawa (JP); Atsuhiro Tokita, Osaka (JP); Junya Asano, Fukushima (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/745,178

(22) PCT Filed: Aug. 29, 2016

(86) PCT No.: PCT/JP2016/075134
§ 371 (c)(1),
(2) Date: Jan. 16, 2018

(87) PCT Pub. No.: WO2017/038737
PCT Pub. Date: Mar. 9, 2017

(65) Prior Publication Data
US 2018/0208763 A1 Jul. 26, 2018

(30) Foreign Application Priority Data

Aug. 31, 2015 (JP) .............................. JP2015-171097

(51) Int. Cl.
*C08L 69/00* (2006.01)
*C08J 5/18* (2006.01)

(52) U.S. Cl.
CPC ................. *C08L 69/00* (2013.01); *C08J 5/18* (2013.01); *C08J 2369/00* (2013.01); *C08J 2427/18* (2013.01); *C08L 2201/02* (2013.01); *C08L 2201/08* (2013.01)

(58) Field of Classification Search
CPC ...... C08L 69/00; C08L 27/18; C08L 2201/02; C08L 2201/08; C08K 5/0066; C08K 5/42; C08K 5/523; C08K 5/5399; C08J 2427/18; C08J 5/18
See application file for complete search history.

(56) References Cited

U.S. PATENT DOCUMENTS

| | | | | |
|---|---|---|---|---|
| 5,451,632 A | * | 9/1995 | Okumura | C08G 64/186 524/537 |
| 2004/0058828 A1 | * | 3/2004 | Iwata | C10M 111/04 508/104 |
| 2009/0186207 A1 | * | 7/2009 | Hayata | C08L 69/00 428/220 |
| 2011/0269882 A1 | | 11/2011 | Kurokawa et al. | |
| 2013/0030094 A1 | * | 1/2013 | Uchimura | C08G 64/06 524/115 |
| 2014/0205334 A1 | * | 7/2014 | Kondoh | G03G 15/2053 399/329 |
| 2015/0025180 A1 | | 1/2015 | Monden | |
| 2015/0086856 A1 | | 3/2015 | Tomita et al. | |
| 2016/0181576 A1 | * | 6/2016 | Zouta | C08K 5/103 429/156 |

FOREIGN PATENT DOCUMENTS

| | | |
|---|---|---|
| JP | 2002-371177 A | 12/2002 |
| JP | 2005-200588 A | 7/2005 |
| JP | 2006-316152 A | 11/2006 |
| JP | 2008-222813 A | 9/2008 |
| JP | 2011-57888 A | 3/2011 |
| JP | 2011-168682 A | 9/2011 |
| JP | 2013-64047 A | 4/2013 |
| JP | 2013-224349 A | 10/2013 |
| WO | 2013/115151 A1 | 8/2013 |

OTHER PUBLICATIONS

Ebnesajjad et al., "Fluoropolymer Additives", p. 99, 2011. (Year: 2011).*
Machine translation of JP2013064047A, retrieved Feb. 3, 2019. (Year: 2013).*
International Search Report from Patent Application No. PCT/JP2016/075134, dated Sep. 29, 2016.

* cited by examiner

*Primary Examiner* — Callie E Shosho
*Assistant Examiner* — Krupa Shukla
(74) *Attorney, Agent, or Firm* — Greenblum & Bernstein, P.L.C.

(57) ABSTRACT

The present invention provides a polycarbonate resin composition containing a polycarbonate resin (A), a flame retardant (B), and a fluoropolymer (C), said polycarbonate resin composition being characterized in that the fluidity of the fluoropolymer (C), as measured using a Koka flow tester (under the conditions of a measurement temperature of 400° C., a measurement load of 0.98 MPa, and a die hole diameter of 2.1 mm), is $0.1 \times 10^{-3}$ cm$^3$/sec or greater. The present invention also provides a sheet and a film.

15 Claims, No Drawings

FLAME-RETARDANT POLYCARBONATE RESIN COMPOSITION, SHEET AND FILM USING SAME, AND MANUFACTURING METHOD FOR EACH

TECHNICAL FIELD

The present invention relates to a flame-retardant polycarbonate resin composition. Specifically, the present invention relates to a polycarbonate resin composition having excellent sheet/film moldability and flame retardance, a sheet or film obtained by using the same, and a method for the production thereof.

BACKGROUND ART

Polycarbonate resins have many excellent characteristics such as excellent heat resistance, mechanical properties and electric properties and high dimensional accuracy, and therefore are widely used in a variety of fields. For example, molded products obtained by injection molding, extrusion molding or the like of polycarbonate resins are utilized for automotive materials, materials for electrical and electronic equipments, housing materials, materials for the production of parts in other industrial fields, etc.

In particular, flame retarded polycarbonate resin compositions are used as members for information/mobile devices such as computers, notebook computers, tablet terminals, smartphones and mobile phones, office automation equipments such as printers and copying machines, etc.

Recently, reduction in size and thickness of electronic equipments including the above-described information/mobile devices has been accelerated. As a member to be used, a sheet/film having high flame retardance, which is evaluated as VTM-2 or higher in the UL94 test even when the thickness thereof is 0.25 mm or less, has been desired.

For example, Patent Documents 1 and 2 describe a flame-retardant polycarbonate resin composition, wherein a phosphazene compound or a condensed phosphoric acid ester-based compound is used as a flame retardant. However, this is a composition optimized mainly for injection molding, and the viscosity of the resin component is low. In addition, since a fluoroolefin resin having fibril-forming ability, which has large shrinkage at the time of molding and poor dispersibility, is blended in the composition, it is unsuitable for the production of a film or sheet. Specifically, when this composition is molded into a film/sheet by means of a melt extrusion method, the film/sheet has a large thickness unevenness, and when a test piece having a thickness of 0.25 mm or less is subjected to the UL-94 VTM burning test, it is evaluated as non-conforming because tearing of the film during flame contact exceeds the bench mark.

Patent Document 3 describes a resin sheet, wherein a polycarbonate, a phosphorus-based flame retardant and a polyfluoroethylene are blended. However, regarding the composition in the Examples of Patent Document 3, the type of PTFE is not clear from the description. Moreover, not only a product of polycarbonate having high flowability, but also a phosphorus-based flame retardant that increases flowability and a fibrillated polyfluoroethylene having poor dispersibility are blended in the composition of the Examples, and for this reason, a film/sheet obtained by the melt extrusion method has a large thickness unevenness. Similarly, in this case, when a test piece having a thickness of 0.25 mm or less is subjected to the UL-94 VTM burning test, it is evaluated as non-conforming because tearing of the film during flame contact exceeds the bench mark.

PRIOR ART DOCUMENTS

Patent Documents

Patent Document 1: Japanese Laid-Open Patent Publication No. 2013-224349
Patent Document 2: Japanese Laid-Open Patent Publication No. 2011-057888
Patent Document 3: Japanese Laid-Open Patent Publication No. 2005-200588

SUMMARY OF THE INVENTION

Problems to be Solved by the Invention

The problems to be solved by the present invention are to provide a polycarbonate resin composition, which provides excellent thin-wall flame retardance and suppressed heat shrinkage, and a sheet/film obtained by using the same.

Means for Solving the Problems

The present inventors diligently made researches in order to solve the above-described problems, and found that the problems can be solved by producing a sheet/film using a resin composition consisting of a mixture containing a polycarbonate, a flame retardant and a fluoropolymer having a specific flow value.

Specifically, the present invention is as described below.
[1] A polycarbonate resin composition containing a polycarbonate resin (A), a flame retardant (B) and a fluoropolymer (C), wherein the flowability of the fluoropolymer (C) measured using a Koka flow tester at a measurement temperature of 400° C. with a measurement load of 0.98 MPa and a die hole diameter of 2.1 mm is $0.1 \times 10^{-3}$ cm$^3$/sec or more.
[2] The polycarbonate resin composition according to item [1], wherein the 30% particle diameter of the fluoropolymer (C) is 4.0 μm or less.
[3] The polycarbonate resin composition according to item [1] or [2], wherein the flame retardant (B) is at least one selected from the group consisting of a halogen-based flame retardant, a phosphorus-based flame retardant, an organometallic salt-based flame retardant and a silicone-based flame retardant.
[4] The polycarbonate resin composition according to item [3], wherein the phosphorus-based flame retardant is a phosphazene compound or a condensed-type phosphoric acid ester.
[5] The polycarbonate resin composition according to any one of items [1] to [4], wherein the fluoropolymer (C) is a polymer or copolymer comprising a tetrafluoroethylene structure.
[6] The polycarbonate resin composition according to any one of items [1] to [5], which contains 69 to 99.989% by mass of the polycarbonate resin (A), 0.01 to 30% by mass of the flame retardant (B) and 0.001 to 1% by mass of the fluoropolymer (C).
[7] The polycarbonate resin composition according to any one of items [1] to [6], which is for a sheet or film.
[8] A sheet or film, wherein the polycarbonate resin composition according to any one of items [1] to [7] is used.

[9] The sheet or film according to item [8], which has a thickness of 30 to 200 μm, wherein the flame retardant (B) contains the phosphorus-based flame retardant.

[10] The sheet or film according to item [8], which has a thickness of 200 to 500 μm, wherein the flame retardant (B) contains the halogen-based flame retardant.

[11] A method for producing a sheet or film, which comprises extrusion molding the polycarbonate resin composition according to any one of items [1] to [7].

Advantageous Effect of the Invention

By using the polycarbonate resin composition of the present invention, a film/sheet having excellent flame retardance is provided. Moreover, heat shrinkage at the time of molding can be suppressed by using the polycarbonate resin composition of the present invention, and this realizes a film/sheet, wherein at least one of reduction in thickness unevenness and reduction in heat shrinkage at the time of aging is achieved. Such a film/sheet can be suitably used as an insulation film for electrical and electronic equipments, a film for nameplates and a film for cases of battery packs, etc.

BEST MODE FOR CARRYING OUT THE INVENTION

Hereinafter, the present invention will be described in detail. Note that the present invention is not limited to the below-described embodiments, and can be arbitrarily changed and then carried out without departing from the gist of the present invention. Note that all the documents and publications cited herein are incorporated herein by reference in their entireties regardless of purposes thereof. In addition, the contents disclosed in the claims, specification, drawings and abstract of Japanese Patent Application No. 2015-171097 (filed on Aug. 31, 2015), to which priority is claimed by the present application, are incorporated herein by reference in their entireties.

[Polycarbonate Resin (A)]

The type of the polycarbonate resin (A) (hereinafter sometimes referred to as "the component (A)") to be used in the present invention is not particularly limited, but an aromatic polycarbonate resin is particularly preferably used in terms of heat resistance and flame retardance. The polycarbonate resin is a branched or unbranched thermoplastic polymer or copolymer, which is obtained by reacting a dihydroxy compound or this and a small amount of a branching agent with phosgene or triphosgene or carbonic acid diester.

The method for producing the polycarbonate resin is not particularly limited, and it is possible to use a polycarbonate resin produced by a conventionally known phosgene method (interfacial polymerization method), melting method (transesterification method) or the like. Further, in the case of using the melting method, it is possible to use a polycarbonate resin in which the amount of OH groups of terminal groups is adjusted.

The ratio of the polycarbonate resin (A) in the polycarbonate resin composition of the present invention (100% by mass) is not particularly limited, but it is usually 99.989 to 69% by mass. In the case where a halogen-based flame retardant is blended, the ratio is usually 70 to 90% by mass, and preferably 75 to 80% by mass. In the case where a phosphorus-based flame retardant is blended, the ratio is usually 75 to 95% by mass, and preferably 80 to 92% by mass. In the case where an organometallic salt-based flame retardant is blended, the ratio is usually 99 to 99.989% by mass, preferably 99.5 to 99.985% by mass, more preferably 99.7 to 99.98% by mass, and particularly preferably 99.85 to 99.97% by mass. In the case where a silicone-based flame retardant is blended, the ratio is usually 80 to 99.989% by mass, preferably 90 to 99.5% by mass, and more preferably 95 to 99% by mass.

Examples of the dihydroxy compound as a raw material include 2,2-bis(4-hydroxyphenyl)propane (i.e., "bisphenol A"), tetramethylbisphenol A, bis(4-hydroxyphenyl)-p-diisopropylbenzene, hydroquinone, resorcinol and 4,4-dihydroxydiphenyl. Two or more of these compounds may be used in combination. In terms of heat resistance and availability, it is preferred to use bisphenol A as the main component. The polycarbonate resin containing bisphenol A as the main component is a polycarbonate resin, wherein the ratio of bisphenol A in bisphenols used is 60 to 100 mol %, and preferably 90 to 100 mol %. Further, it is also possible to use a compound in which at least one tetraalkylphosphonium sulfonate is bound to the above-described aromatic dihydroxy compound.

Further, the polycarbonate resin may be a copolymer mainly composed of a polycarbonate resin such as a copolymer of the dihydroxy compound and a compound having a siloxane structure.

For obtaining a branched polycarbonate resin, a part of the above-described dihydroxy compound may be substituted with a branching agent. The branching agent is not particularly limited, and examples thereof include a polyhydroxy compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene and 1,1,1-tri(4-hydroxyphenyl)ethane, and 3,3-bis(4-hydroxyaryl)oxyindole (i.e., "isatinbisphenol"), 5-chloroisatin, 5,7-dichloroisatin and 5-bromoisatin. The amount of the compound to be used for substitution is usually 0.01 to 10 mol %, and preferably 0.1 to 2 mol % relative to the dihydroxy compound.

As the polycarbonate resin (A), among the above-described ones, preferred is a polycarbonate resin derived from 2,2-bis(4-hydroxyphenyl)propane (i.e., "bisphenol A") or a polycarbonate copolymer derived from 2,2-bis(4-hydroxyphenyl)propane (i.e., "bisphenol A") and another aromatic dihydroxy compound.

The above-described polycarbonate resins may be used solely, or two or more of them may be used by mixing thereof.

For adjusting the molecular weight of the polycarbonate resin (A), as a terminating agent, a monovalent hydroxy compound, for example, an aromatic hydroxy compound may be used. Examples of the monovalent aromatic hydroxy compound include m- and p-methylphenol, m- and p-propylphenol, p-tert-butylphenol and p-long chain alkyl substituted phenol.

The molecular weight of the polycarbonate resin (A) to be used in the present invention can be arbitrarily determined depending on the intended use, and it may be suitably selected and determined based on the blending ratio of the flame retardant (B) and the fluoropolymer (C). In terms of moldability, strength of molded products, etc., the viscosity average molecular weight [Mv] of the aromatic polycarbonate resin (A) is preferably 12,000 to 50,000, more preferably 17,000 to 40,000, and even more preferably 20,000 to 30,000. When the viscosity average molecular weight is 12,000 or more, mechanical strength is improved, and excellent film moldability is obtained when using a melt extrusion method. Meanwhile, when the viscosity average molecular weight is 50,000 or less, since the polycarbonate resin composition has given flowability, good extrusion processability and production rate are obtained, and deterioration of additives due to increase of resin temperature is prevented. Furthermore, when the viscosity average molecular weight is 17,000 or more, in particular, 20,000 or more, sheet/film moldability in the case of using a melt extrusion method is improved. Further, when the viscosity average molecular weight is 40,000 or less, in particular, 30,000 or less, the processing temperature can be decreased, and roll contamination caused by generation of a gas derived from the flame retardant (B) can be reduced.

In this regard, the viscosity-average molecular weight [Mv] of the polycarbonate resin can be measured by the below-described method.

<Measurement Conditions for Viscosity-Average Molecular Weight (Mv)>

As a solvent, methylene chloride is used, the limiting viscosity [η] (unit: dl/g) at 20° C. is obtained using an Ubbelohde viscometer, and calculation is made according to Schnell's viscosity equation described below, thereby obtaining a value of the viscosity-average molecular weight [Mv].

$$\eta = 1.23 \times 10^{-4} \times Mv^{0.83}$$ <Schnell's Viscosity Equation>

In this regard, the value of the limiting viscosity [η] is obtained by carrying out the measurement of the specific viscosity [$\eta_{sp}$] with each solution concentration [C](g/dl) and calculation according to the below-described formula $$\eta = \lim_{c \to 0} \eta_{sp}/c$$

[Flame Retardant (B)]

The polycarbonate resin composition of the present invention contains the flame retardant (B) for the improvement of flame retardance. The flame retardant (B) to be used in the present invention is not particularly limited, and examples thereof include a halogen-based flame retardant, a phosphorus-based flame retardant, an organometallic salt-based flame retardant and a silicone-based flame retardant. Among them, the halogen-based flame retardant has the highest flame retardant effect. The organometallic salt-based flame retardant and the silicone-based flame retardant have the flame retardant effect slightly lower than that of the halogen-based flame retardant, but these are environmentally desirable. The phosphorus-based flame retardant has the second highest flame retardant effect among them, but when the adding amount thereof is increased, heat resistance may be reduced. In the present invention, these flame retardants may be used solely or in combination depending on the intended use or purpose.

The ratio of the flame retardant (B) in the polycarbonate resin composition of the present invention (100% by mass) is not particularly limited, but it is usually 0.01 to 30% by mass.

<Halogen-Based Flame Retardant>

Typical examples of the halogen-based flame retardant include: a bromine-based flame retardant including a bromine-containing compound such as decabromodiphenyl ether, tetrabromobisphenol A, tetrabromobisphenol A carbonate oligomer, tetrabromobisphenol S, tetrabromobisphenol S carbonate oligomer, 1,2-bis(2',3',4',5',6'-pentabromophenyl)ethane, 1,2-bis(2,4,6-tribromophenoxy)ethane, 2,4,6-tris(2,4,6-tribromophenoxy)-1,3,5-triazine, 2,6- or 2,4-dibromophenol, brominated polystyrene, ethylenebistetrabromophthalimide, hexabromocyclododecane, hexabromobenzene, pentabromobenzyl acrylate, 2,2-bis[4'(2",3"-dibromopropoxy)-3',5'-dibromophenyl]-propane, bis(3,5-dibromo,4-dibromopropoxyphenyl)sulfone and tris(2,3-dibromopropyl)isocyanurate; and a chlorine-based flame retardant including a chlorine-containing compound such as chlorinated paraffin, chlorinated polyethylene, chlorinated polypropylene, perchloropentacyclodecane, dodecachlorododecahydrodimethanodibenzocyclooctene and dodecachlorooctahydrodimethanodibenzofuran. These flame retardants may be used solely, or two or more of them may be used in combination. Among them, tetrabromobisphenol A carbonate oligomer is particularly preferably used from the viewpoint of the balance between heat stability and mechanical properties of molded products. In this regard, in the case of bromine-containing aromatic polycarbonate oligomers such as polycarbonate oligomers of tetrabromobisphenol A, when the polymerization degree is 1, bleeding out from molded products easily occurs at the time of molding, and when the polymerization degree is increased, it becomes difficult to obtain sufficient flowability. The polymerization degree is preferably 2 to 15. Bromine-containing aromatic polycarbonate oligomers satisfying the above-described requirements are commercially available and can be easily obtained. For example, an oligomer obtained by reacting 2,4,6-tribromophenol (sometimes abbreviated as "TBPH") with TBA as a molecular weight control agent and phosgene (average polymerization degree: 5) is commercially available as Iupilon FR-53 (trade name) from Mitsubishi Engineering-Plastics Corporation.

The content of the halogen-based flame retardant in the polycarbonate resin composition of the present invention is not particularly limited, but it is usually 5 to 30% by mass, preferably 10 to 30% by mass, and particularly preferably 20 to 25%.

<Phosphorus-Based Flame Retardant>

Preferred examples of the flame retardant (B) include the phosphorus-based flame retardant. The phosphorus-based flame retardant can impart excellent flame retardance. However, when the adding amount thereof is increased, thickness unevenness is caused at the time of molding into a film/sheet by reduction in heat resistance (glass transition temperature) of resin components and reduction in melt viscosity, and for this reason, it is conventionally difficult to obtain a film/sheet having excellent flame retardance with a small thickness unevenness. In the present invention, by blending the fluoropolymer (C) having a specific flow value in the resin composition, reduction in heat resistance of resin components is suppressed, and it is possible to obtain a film/sheet having excellent flame retardance, wherein thickness unevenness is reduced.

As the phosphorus-based flame retardant, a phosphoric acid ester-based flame retardant, a phosphazene-based flame retardant, etc. can be used. As the phosphorus-based flame retardant, such flame retardants may be used solely, or two or more of them may be used as a mixture.

(Phosphoric Acid Ester-Based Flame Retardant)

As the phosphorus-based flame retardant, in particular, a phosphoric acid ester-based flame retardant is preferably used because it has high flame retardant effect and also has flowability improvement effect. The phosphoric acid ester-based flame retardant is not limited, but it is particularly preferably a phosphoric acid ester-based compound represented by general formula (IIa) below.

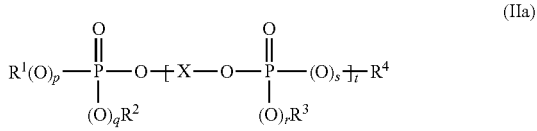

(In formula (IIa): $R^1$, $R^2$, $R^3$ and R each independently represent a $C_{1-8}$ alkyl group which may be substituted with a $C_{1-8}$ alkoxy group, or a $C_{6-20}$ aryl group which may be substituted with a $C_{1-8}$ alkyl group or phenyl which may be substituted with a $C_{1-8}$ alkyl group; p, q, r and s are each independently 0 or 1; t is an integer of 0 to 5; and X represents an arylene group or a divalent group represented by formula (IIb) below.)

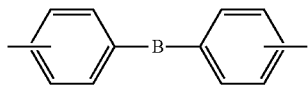

(In formula (IIb): B is a single bond, —C(CH$_3$)$_2$—, —SO$_2$—, —S— or —O—.)

In the above-described general formula (IIa), examples of the aryl group of $R^1$ to $R^4$ include a phenyl group and a naphthyl group. Further, examples of the arylene group of X include a phenylene group and a naphtylene group. When t is 0, the compound represented by general formula (IIa) is a phosphoric acid ester, and when t is larger than 0, the compound is a condensed phosphoric acid ester (including a mixture). In the present invention, the condensed phosphoric acid ester is particularly preferably used.

Specific examples of the phosphoric acid ester-based flame retardant represented by general formula (IIa) above include trimethyl phosphate, triethyl phosphate, tributyl phosphate, trioctyl phosphate, tributoxyethyl phosphate, triphenyl phosphate, tricresyl phosphate, tricresylphenyl phosphate, octyldiphenyl phosphate, diisopropylphenyl phosphate, bisphenol A tetraphenyl diphosphate, bisphenol A tetracresyl diphosphate, bisphenol A tetraxylyl diphosphate, hydroquinone tetraphenyl diphosphate, hydroquinone tetracresyl diphosphate, hydroquinone tetraxylyl diphosphate, resorcinol tetraphenyl diphosphate, resorcinol bisdixylenyl phosphate, etc. Among them, preferred are triphenyl phosphate, bisphenol A tetraphenyl diphosphate, resorcinol tetraphenyl diphosphate, resorcinol bisdi-2,6-xylenyl phosphate, etc. Examples of commercially-available phosphoric acid ester-based flame retardants include FP-600 manufactured by ADEKA Corporation and PX-200 manufactured by Daihachi Chemical Industry Co., Ltd.

The above-described phosphoric acid ester-based flame retardants may be used solely, or two or more of them may be used as a mixture.

<Phosphazene-Based Flame Retardant>

The phosphazene-based flame retardant can suppress reduction in heat resistance of the resin composition due to addition of the flame retardant more than the phosphoric acid ester-based flame retardant, and therefore can be used as an effective phosphorus-based flame retardant. The phosphazene-based flame retardant is an organic compound having a —P═N— bond in the molecule. Preferred examples of the phosphazene-based flame retardant include a cyclic phosphazene compound represented by general formula (IIIa) below, a linear phosphazene compound represented by general formula (IIIb) below, and a crosslinked phosphazene compound in which at least one phosphazene compound selected from the group consisting of compounds of general formulae (IIIa) and (IIIb) below is crosslinked with a crosslinking group. As the crosslinked phosphazene compound, those obtained by crosslinking with a crosslinking group represented by general formula (IIIc) below are preferred in terms of flame retardance.

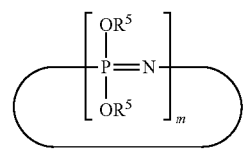

(In formula (IIIa): m is an integer of 3 to 25; and $R^5$s may be the same or different and represent an aryl group or an alkylaryl group.)

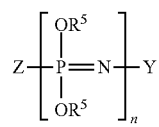

(In formula (IIIb): n is an integer of 3 to 10,000; Z represents a —N═P(OR$^5$)$_3$ group or a —N═P(O)OR$^5$ group; and Y represents a —P(OR$^5$)$_4$ group or a —P(O)(OR$^5$)$_2$ group. $R^5$s may be the same or different and represent an aryl group or an alkylaryl group.)

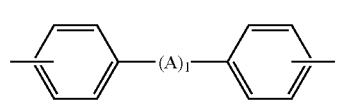

(In formula (IIIc): A is —C(CH$_3$)$_2$—, —SO$_2$—, —S— or —O—; and l is 0 or 1.)

Preferred examples of cyclic and/or linear phosphazene compounds represented by general formulae (IIIa) and (IIIb) include those in which $R^5$ is a $C_{6-20}$ aryl group which may be substituted with a $C_{1-6}$ alkyl group. Specific examples thereof include: a cyclic or linear phosphazene compound in which $R^5$ is an aryl group such as a phenyl group; a cyclic or linear phenoxyphosphazene in which $R^5$ is a $C_{6-20}$ aryl group which is substituted with a $C_{1-6}$, preferably $C_{1-3}$ alkyl such as a tolyl group (o-, m- or p-tolyloxy group) and a xylyl group (2,3-, 2,6- or 3,5-xylyl group); and a cyclic or linear phenoxyphosphazene in which the above-described $R^5$s are combined. More specific examples thereof include: a cyclic and/or linear $C_{1-6}$ alkyl $C_{6-20}$ aryloxy phosphazene such as phenoxyphosphazene, (poly)tolyloxyphosphazene (e.g., o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene, etc.) and (poly)xylyloxyphosphazene; and a cyclic and/or linear $C_{6-20}$ aryl $C_{1-10}$ alkyl $C_{6-20}$ aryloxy phosphazene such as (poly)phenoxytolyloxyphosphazene (e.g., phenoxy-o-tolyloxyphosphazene, phenoxy-m-tolyloxyphosphazene, phenoxy-p-tolyloxyphosphazene, phenoxy-o,m-tolyloxyphosphazene, phenoxy-o,p-tolyloxyphosphazene, phenoxy-m,p-tolyloxyphosphazene, phenoxy-o,m,p-tolyloxyphosphazene, etc.), (poly)phenoxyxylyloxyphosphazene and (poly)phenoxytolyloxyxylyloxyphosphazene. Preferred are a cyclic and/or linear phenoxyphosphazene, a cyclic and/or linear $C_{1-3}$ alkyl $C_{6-20}$ aryloxy phosphazene, and a $C_{6-20}$ aryloxy $C_{1-3}$ alkyl $C_{6-20}$ aryloxy phosphazene (e.g., a cyclic and/or linear tolyloxyphosphazene, a cyclic and/or linear phenoxytolylphenoxyphosphazene, etc.). In this regard, "$C_{1-6}$" means that "the carbon number is 1 to 6", and the same applies to "$C_{6-20}$", "$C_{1-10}$", etc. Further, "(poly)phenoxy . . . " means one or both of "phenoxy . . . " and "polyphenoxy . . . ".

As the cyclic phosphazene compound represented by general formula (IIIa), a cyclic phenoxyphosphazene in which $R^5$ is a phenyl group is particularly preferred. Further, the cyclic phenoxyphosphazene compound is preferably a compound represented by general formula (IIIa), wherein m is an integer of 3 to 8, and may also be a mixture of compounds in which the numbers for m differ from each other. Specific examples thereof include compounds such as cyclophenoxycyclotriphosphazene (compound in which m is 3), octaphenoxycyclotetraphosphazene (compound in which m is 4) and decaphenoxycyclopentaphosphazene (compound in which m is 5), and mixtures thereof. Among them, preferred is a mixture containing 50% by mass or more of a compound in which m is 3, 10 to 40% by mass of a compound in which m is 4 and 30% by mass or less of compounds in which m is 5 or more.

For example, ammonium chloride is reacted with phosphorus pentachloride at 120 to 130° C. to obtain a mixture of cyclic and linear chlorophosphazenes, from which cyclic chlorophosphazenes such as hexachlorocyclotriphosphazene, octachlorocyclotetraphosphazene and decachlorocyclopentaphosphazene are taken out, and then these are subjected to substitution with a phenoxy group, thereby obtaining the above-described cyclic phenoxyphosphazene compound.

As the linear phosphazene compound represented by general formula (IIIb), a linear phenoxyphosphazene in which $R^5$ is a phenyl group is particularly preferred. Examples of the above-described linear phenoxyphosphazene compound include compounds obtained by subjecting a chloride of the cyclic phenoxyphosphazene compound obtained by the above-described method (e.g., hexachlorocyclotriphosphazene) to ring-opening polymerization at 220 to 250° C. and substituting a linear dichlorophosphazene having a polymerization degree of 3 to 10,000 obtained with a phenoxy group. Regarding the linear phenoxyphosphazene compound, n in general formula (IIIb) is preferably 3 to 1,000, more preferably 3 to 100, and even more preferably 3 to 25.

Examples of the crosslinked phenoxyphosphazene compound include compounds having a crosslinked structure of a 4,4'-diphenylene group such as a compound having a crosslinked structure of 4,4'-sulfonyldiphenylene (bisphenol S residue), a compound having a crosslinked structure of a 2,2-(4,4'-diphenylene)isopropylidene group, a compound having a crosslinked structure of a 4,4'-oxydiphenylene group, and a compound having a crosslinked structure of a 4,4'-thiodiphenylene group.

Further, as the crosslinked phosphazene compound, a crosslinked phenoxyphosphazene compound, wherein a cyclic phenoxyphosphazene compound in which $R^5$ in general formula (IIIa) is a phenyl group is crosslinked with a crosslinking group represented by general formula (IIIc) above, or a crosslinked phenoxyphosphazene compound, wherein a linear phenoxyphosphazene compound in which $R^5$ in general formula (IIIb) above is a phenyl group is crosslinked with a crosslinking group represented by general formula (IIIc) above, is preferred in terms of flame retardance, and a crosslinked phenoxyphosphazene compound, wherein the cyclic phenoxyphosphazene compound is crosslinked with a crosslinking group represented by general formula (IIIc) above, is more preferred.

Further, the content of the phenylene group in the crosslinked phenoxyphosphazene compound is usually 50 to 99.9%, and preferably 70 to 90% based on the total number of the phenyl group and the phenylene group in the cyclic phosphazene compound represented by general formula (IIIa) and/or the linear phenoxyphosphazene compound represented by general formula (IIIb). Moreover, the crosslinked phenoxyphosphazene compound is particularly preferably a compound not having a free hydroxyl group in the molecule.

In the present invention, in terms of flame retardance and mechanical properties, the phosphazene-based flame retardant is preferably at least one selected from the group consisting of a cyclic phenoxyphosphazene compound represented by general formula (IIIa) above and a crosslinked phenoxyphosphazene compound, wherein a cyclic phenoxyphosphazene compound represented by general formula (IIIa) above is crosslinked with a crosslinking group. Examples of commercially-available phosphazene-based flame retardants include "Rabitle FP-110" and "Rabitle FP-110T" manufactured by Fushimi Pharmaceutical Co., Ltd. and "SPS100" manufactured by Otsuka Chemical Co., Ltd. which are cyclic phenoxyphosphazenes.

The content of the phosphorus-based flame retardant in the polycarbonate resin composition of the present invention is not particularly limited, but it is usually 5 to 25% by mass. Further, from the viewpoint of heat resistance and flame retardance, the content is preferably 8 to 20% by mass.

The above-described phosphazene-based flame retardants may be used solely, or two or more of them may be used as a mixture.

<Organometallic Salt-Based Flame Retardant>

The organometallic salt compound is preferably an alkali (earth) metal salt of an organic acid, and more preferably an alkali (earth) metal salt of an organic sulfonic acid, each of which has 1 to 50 carbon atoms, and preferably 1 to 40 carbon atoms. In one embodiment of the present invention, this alkali (earth) metal salt of an organic sulfonic acid includes a metal salt (preferably a salt of an alkali metal or alkali earth metal) of a fluorine-substituted alkyl sulfonic acid (perfluoroalkylsulfonic acid) having 1 to 10 carbon atoms, and preferably 2 to 8 carbon atoms. In the case of such a metal salt of a perfluoroalkylsulfonic acid, since flame retardance can be obtained by blending thereof in a small amount, increase of the specific gravity is smaller than the case of blending the halogen-based flame retardant, and reduction of heat resistance is smaller than the case of blending the phosphorus-based flame retardant, and therefore it is preferred. In another embodiment of the present invention, the alkali (earth) metal salt of an organic sulfonic acid includes a metal salt (preferably a salt of an alkali metal or alkali earth metal) of an aromatic sulfonic acid having 7 to 50 carbon atoms, and preferably 7 to 40 carbon atoms. In the case of such a metal salt of an aromatic sulfonic acid, since flame retardance can be obtained by blending thereof in a small amount, increase of the specific gravity is smaller than the case of blending the halogen-based flame retardant, and reduction of heat resistance is smaller than the case of blending the phosphorus-based flame retardant, and therefore it is preferred.

Examples of the alkali metal constituting the metal salt include lithium, sodium, potassium, rubidium and cesium. Examples of the alkaline earth metal include beryllium, magnesium, calcium, strontium and barium. The alkali metal is more preferred, and in terms of heat stability and flame retardance of the resin composition, potassium and sodium are particularly preferred.

Specific examples of the alkali metal salt of perfluoroalkylsulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. These substances may be used solely, or two or more of them may be used in combination.

Specific examples of the alkali (earth) metal salt of aromatic sulfonic acid include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate and formalin condensate of sodium anthracenesulfonate.

Preferred examples of organic metal salt compounds other than the alkali (earth) metal salt of sulfonic acid include alkali (earth) metal salts of a sulfuric acid ester and alkali (earth) metal salts of an aromatic sulfonamide. Examples of the alkali (earth) metal salts of a sulfuric acid ester include alkali (earth) metal salts of a sulfuric acid ester of a monohydric and/or polyhydric alcohol. Examples of the sulfuric acid ester of a monohydric and/or polyhydric alcohol include methyl sulfuric acid ester, ethyl sulfuric acid ester, lauryl sulfuric acid ester, hexadecyl sulfuric acid ester, sulfuric acid ester of a polyoxyethylene alkylphenyl ether, mono-, di-, tri- and tetra-sulfuric acid esters of pentaerythritol, sulfuric acid ester of monoglyceride laurate, sulfuric acid ester of monoglyceride palmitate and sulfuric acid ester of monoglyceride stearate. Among alkali (earth) metal salts of these sulfuric acid esters, preferred are alkali (earth) metal salts of a lauryl sulfuric acid ester.

Examples of the alkali (earth) metal salts of an aromatic sulfonamide include alkali (earth) metal salts of saccharin, N-(p-tolylsulfonyl)-p-toluenesulfoimide, N—(N'-benzylaminocarbonyl)sulfanilimide and N-(phenylcarboxyl)sulfanilimide.

The content of the organometallic salt-based flame retardant in the polycarbonate resin composition of the present invention is not particularly limited, but it is usually 0.001 to 1% by mass, preferably 0.005 to 0.5% by mass, more preferably 0.01 to 0.3% by mass, and particularly preferably 0.03 to 0.15% by mass.

<Silicone-Based Flame Retardant>

A silicone compound used as the silicone-based flame retardant improves flame retardance through its chemical reaction at the time of burning. As the compound, conventionally, various compounds proposed as flame retardants for polycarbonate resins can be used. As a functional group, specifically, at least one group selected from an alkoxy group and hydrogen (i.e., Si—H group) is preferably contained in a predetermined amount. The structure of the silicone compound is generally constituted by arbitrarily combining four different kinds of siloxane units described below. The siloxane units are:

M units: monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ and $(CH_3)(C_6H_5)(CH_2=CH)SiO_{1/2}$;

D units: bifunctional siloxane units such as $(CH_3)_2SiO$, $H(CH_3)SiO$, $H_2SiO$, $H(C_6H_5)SiO$, $(CH_3)(CH_2=CH)SiO$ and $(C_6H_5)_2SiO$;

T units: trifunctional siloxane units such as $(CH_3)SiO_{3/2}$, $(C_3H_7)SiO_{3/2}$, $HSiO_{3/2}$, $(CH_2=CH)SiO_{3/2}$ and $(C_6H_5)SiO_{3/2}$; and Q unit: tetrafunctional siloxane unit represented by $SiO_2$.

Specific examples of rational formulae of the structure of the silicone compound to be used as the silicone-based flame retardant include $D_n$, $T_p$, $M_mD_p$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ and $D_nT_pQ_q$. Among them, preferred structures of the silicone compound are $M_mD_n$, $M_mT_p$, $M_mD_nT_p$ and $M_mD_nQ_q$, and more preferred is $M_mD_n$ or $M_mD_nT_p$.

In this regard, the coefficients m, n, p and q in the rational formulae above are each independently an integer of 1 or more, indicating the polymerization degree of each siloxane unit, and the total number of coefficients in the rational formulae is the average polymerization degree of the silicone compound. The average polymerization degree is preferably 3 to 150, more preferably 3 to 80, even more preferably 3 to 60, and particularly preferably 4 to 40. Within the more preferred range, more excellent flame retardance is obtained. When any one of m, n, p and q is 2 or more, 2 or more types of the siloxane units having this coefficient may differ in the hydrogen atom or organic residue bonded thereto.

The silicone compound may have a linear or branched structure. The organic residue bonded to the silicon atom has preferably 1 to 30 carbon atoms, and more preferably 1 to 20 carbon atoms. Specific examples of the organic residue include: alkyl groups such as methyl group, ethyl group, propyl group, butyl group, hexyl group and decyl group; cycloalkyl groups such as cyclohexyl group; aryl groups such as phenyl group; and aralkyl groups such as tolyl group. It is more preferably an alkyl group having 1 to 8 carbon atoms, an alkenyl group or an aryl group. In one embodiment of the present invention, the alkyl group is an alkyl group having 1 to 4 carbon atoms such as methyl group, ethyl group and propyl group. In this case, a methyl group is preferred in terms of commercial availability. In another embodiment of the present invention, the silicone compound used as the silicone-based flame retardant contains an aryl group. This case is preferred because compatibility with polycarbonate and flame retardance are improved by the aryl group. Meanwhile, a silane compound and a siloxane compound as organic surface treatment agents for a titanium dioxide pigment are clearly distinguished from the silicone-based flame retardant with respect to preferred embodiments on the point that more preferred effects are obtained when the aryl group is not contained therein. The silicone compound used as the silicone-based flame retardant may contain a reactive group in addition to the aforementioned Si—H group and alkoxy group. Examples of the reactive group include amino group, carboxyl group, epoxy group, vinyl group, mercapto group and methacryloxy group.

The content of the silicone-based flame retardant in the polycarbonate resin composition of the present invention is not particularly limited, but it is usually 0.01 to 20% by mass, more preferably 0.5 to 10% by mass, and even more preferably 1 to 5% by mass.

[Fluoropolymer (C)]

The fluoropolymer (C) is added in order to prevent dripping of a burning material of the polycarbonate resin composition of the present invention.

The fluoropolymer (C) to be used in the present invention is characterized in that it has a flow value of $0.1 \times 10^{-3}$ cm$^3$/sec or more at 400° C.

Examples of the fluoropolymer include a fluoroolefin resin. The fluoroolefin resin is usually a polymer or copolymer containing a fluoroethylene structure. The polymer or copolymer containing a fluoroethylene structure is a polymer mainly composed of a fluoroethylene structure (structural unit). Specifically, the ratio of the fluoroethylene structure (structural unit of fluoroethylene) is preferably 40 to 100% by mass, more preferably 50 to 100% by mass, and even more preferably 60 to 100% by mass of all the monomer units constituting the fluoropolymer.

Specific examples thereof include a polydifluoroethylene resin, a polytetrafluoroethylene resin, a tetrafluoroethylene/hexafluoropropylene copolymer resin and a tetrafluoroethylene/perfluoroalkylvinylether copolymer resin. Among them, preferred are a polytetrafluoroethylene resin, etc. in terms of flame retardance.

In the present invention, as the index of low-molecular-weight fluoropolymers, the flow value, which is obtained by the measurement of the melt viscosity using a flow tester (manufactured by Shimadzu Corporation) described in JIS K7210-1: 2014 Annex JA, is used. For the measurement, a die having a diameter of 2.1 mm and a length of 8 mm is used, and 2 g of a sample, which is heated at 400° C. for 5 minutes in advance, is subjected to the measurement with a load of 0.98 MPa while the above-described temperature is held. The present invention is characterized in that a fluoropolymer having low fibril-forming ability, wherein the flow value thereof (flowability obtained using a Koka flow tester (measurement temperature: 400° C., measurement load: 0.98 MPa, die hole diameter. 2.1 mm)) is $0.1 \times 10^{-3}$ cm$^3$/sec or more, is used. The upper limit of the flow value of the fluoropolymer is not particularly limited, but it is usually $500 \times 10^3$ cm$^3$/sec or less.

The flow value of the fluoropolymer can be adjusted by controlling the molecular weight, type, etc. of the fluoropolymer. In general, when the molecular weight of a fluoropolymer is decreased, the flow value tends to increase. Specifically, in one embodiment of the present invention, the fluoropolymer (C) is a fluoropolymer having low fibril-forming ability generally made of a low-molecular-weight body having a number average molecular weight of 600,000 or less. In a preferred embodiment, the fluoropolymer (C) has a number average molecular weight of 10,000 or more.

Note that "fibril-forming ability" means that resins show tendency to be bound together to become fibrous due to an external action such as a shear force.

Conventionally, as a fluoropolymer, a fibrillated PTFE has been generally used because of its excellent dripping prevention effect. A fluoropolymer having high fibril-forming ability generally has a flow value lower than $0.1 \times 10^{-3}$ cm$^3$/sec, and therefore almost does not flow in the actual measurement using a flow tester. In the case of such a fluoropolymer having high fibril-forming ability and poor flowability, dispersibility thereof in a resin composition and a molded product of film/sheet is poor. Moreover, since a fibrillated PTFE has a high molecular weight, it is fibrillated when subjected to shear, and such fibers may cause shrinkage of a resin composition. The problem of shrinkage has a significant influence particularly on thin-walled products (e.g., thickness unevenness and shrinkage at the time of aging in thin-walled molded products). Specifically, when molding a film/sheet, particularly a thin-walled film/sheet, uniformity of shrinkage of the film/sheet discharged from a dice is lost, and as a result, thickness unevenness of the film/sheet may be increased, and in the burning test of a thin-walled film, a test piece is melted and torn at the time of flame contact and therefore it may be impossible to obtain flame retardance. In addition, even after molding, shrinkage at the time of aging may be caused. Specifically, it is difficult to obtain a film/sheet having excellent flame retardance when using a conventional resin composition.

The present inventors found that, surprisingly, the above-described fluoropolymer having a specific flow value does not become fibrous even when subjected to shear (force generated by flow of resin and kneading by a screw), has excellent dispersibility in a resin composition and a molded product of film/sheet, and therefore can suppress shrinkage of the resin composition. Specifically, by blending the above-described specific fluoropolymer, heat shrinkage at the time of molding the resin composition (shrinkage of a film/sheet discharged from a dice) is suppressed, and a film/sheet in which thickness unevenness is suppressed is obtained. Moreover, in the obtained film/sheet, there is no extreme orientation of PTFE due to fibrillation, and therefore heat shrinkage at the time of aging can be suppressed.

In one embodiment of the present invention, the fluoropolymer (C) having a specific flow value as described above and the phosphorus-based flame retardant are used in combination in the polycarbonate resin composition. In general, when using a phosphorus-based flame retardant, heat shrinkage at the time of molding a resin composition tends to easily occur. In this embodiment, by combined use of the fluoropolymer (C) having a specific flow value as described above and the phosphorus-based flame retardant, heat shrinkage at the time of molding is suppressed, and it is possible to obtain a film/sheet in which both the improvement of flame retardance and reduction of thickness unevenness are achieved. In particular, in the case of combined use of the phosphorus-based flame retardant and the fluoropolymer (C), even when a thin film/sheet has a thickness of 30 to 200 μm (more preferably 30 to 100 μm), thickness unevenness can be reduced, and excellent flame retardance can be achieved.

In another embodiment of the present invention, the fluoropolymer (C) having a specific flow value as described above and at least one of the halogen-based flame retardant, the organometallic salt-based flame retardant and the silicone-based flame retardant are used in combination in the polycarbonate resin composition. When blending the halogen-based flame retardant, the organometallic salt-based flame retardant or the silicone-based flame retardant, since reduction of heat resistance of resin components due to blending of the flame retardant is suppressed more than the case of blending the phosphorus-based flame retardant, the rate of generation of thickness unevenness at the time of molding is low, but defects may be caused by heat shrinkage after molding. In the present invention, by blending the fluoropolymer having a specific flow value, it is possible to obtain a film/sheet in which shrinkage at the time of aging is reduced.

In particular, when using the halogen-based flame retardant and the fluoropolymer (C) in combination, the problem of heat shrinkage (shrinkage at the time of aging) can be significantly reduced. This effect is particularly significant in the case of a film/sheet having a thickness of 200 to 500 μm.

Examples of the fluoroethylene resin having high fibril-forming ability include "Teflon (registered trademark) 6-J" and "Teflon (registered trademark) 640J" manufactured by Du Pont-Mitsui Fluorochemicals Co., Ltd., Polyflon F-series (e.g., "Polyflon FA-500 series", "Polyflon F-201 series" and "Polyflon F103 series") manufactured by Daikin Industries, Ltd., and "Metablen A-3800" and "Metablen A-3750" manufactured by Mitsubishi Rayon Co., Ltd. These materials are conventionally used as dripping prevention agents when thermoplastic resins are flame retarded, and do not correspond to the fluoropolymer of the present invention. Further, examples of commercially-available aqueous dispersions of the fluoroethylene resin having fibril-forming ability include "Teflon (registered trademark) 30J" and "Teflon (registered trademark) 31-JR" manufactured by Du Pont-Mitsui Fluorochemicals Co., Ltd. and "Fluon D-1" manufactured by Daikin Industries, Ltd., and these materials do not correspond to the fluoropolymer of the present invention. Moreover, "Polyflon M-series" manufactured by Daikin Industries, Ltd. have a 30% particle diameter, which is described later, of more than 4.0 μm, and therefore do not correspond to the fluoropolymer of the present invention.

In one embodiment of the present invention, the fluoropolymer (C) is also characterized in that it has a 30% particle diameter of 4.0 μm or less. The 30% particle diameter refers to a particle diameter at the position of 30% (volume percentage of passing: 30%) from the smaller particle diameter side in a volume-based particle size distribution curve. The particle size distribution is obtained by the measurement using a laser diffraction type particle size distribution measuring device according to a dry method. When the 30% particle diameter is 4.0 μm or less, good outer appearance and thickness precision are obtained. The 30% particle diameter is more preferably 3.5 μm or less, and in this case, thickness precision can be further improved, and in addition, flame retardance can be further improved. The 30% particle diameter is even more preferably 3.2 μm or less in terms of further improvement of flame retardance. Meanwhile, when the 30% particle diameter is more than 4.0 μm, outer appearance of films may be deteriorated, and it may be impossible to obtain sufficient thickness precision. The lower limit of the 30% particle diameter is not particularly limited, and the smaller it is, the better from the viewpoint of the improvement of dispersibility, but it is usually 0.5 μm or more, and it may be, for example, 0.7 μm or more, and 1.0 μm or more.

Examples of the fluoroethylene resin having low fibril-forming ability with a 30% particle diameter of 4.0 μm or less include "Teflon (registered trademark) TLP 10F-1" manufactured by Du Pont-Mitsui Fluorochemicals Co., Ltd., and "Lubron L-2" and "Lubron L-5F" manufactured by Daikin Industries, Ltd.

As the fluoropolymer (C), one type of a fluoropolymer may be contained, or two or more types of fluoropolymers may be contained with any combination and any ratio.

The content of the fluoropolymer in the polycarbonate resin composition of the present invention is preferably 0.001% by mass or more, more preferably 0.01% by mass or more, even more preferably 0.05% by mass or more, and particularly preferably 0.1% by mass or more, while it is usually 1% by mass or less, preferably 0.75% by mass or less, and more preferably 0.5% by mass or less. When the content of the fluoropolymer is less than the lower limit of the above-described range, the effect of improving flame retardance exerted by the fluoropolymer may be insufficient. When the content of the fluoropolymer is more than the upper limit of the above-described range, poor outer appearance and reduction in mechanical strength of molded products obtained by molding the polycarbonate resin composition may occur.

[Other Components]
(Other Resin Components)

The aromatic polycarbonate resin composition of the present invention may contain resin components other than the polycarbonate resin (A) and the fluoropolymer (C) within a range in which the purpose of the present invention is not impaired. Examples of other resin components which can be blended include a polystyrene resin, a high impact polystyrene resin, a hydrogenated polystyrene resin, a polyacrylstyrene resin, an ABS resin, an AS resin, an AES resin, an ASA resin, an SMA resin, a polyalkyl methacrylate resin, a polymethacrylic methacrylate resin, a polyphenylether resin, a polycarbonate resin other than the component (A), an amorphous polyalkylene terephthalate resin, a polyester resin, an amorphous polyamide resin, poly-4-methylpentene-1, a cyclic polyolefin resin, an amorphous polyarylate resin and polyethersulfone. These components may be used solely, or two or more of them may be used in combination.

(Other Additives)

The polycarbonate resin composition of the present invention may further contain various additives within a range in which the effects of the present invention are not reduced. Examples of such additives include a stabilizer, an antioxidant, a mold release agent, an ultraviolet absorber, a stain pigment, an antistatic agent, a flame retardant, an impact strength modifier, a plasticizer, a dispersing agent, an antimicrobial agent and an inorganic filler (a silicate compound, glass fiber, carbon fiber, etc.). One type of such an additive for resin may be contained, or two or more types of such additives may be contained with any combination and any ratio.

[Method for Producing Polycarbonate Resin Composition]

The method for producing the polycarbonate resin composition of the present invention is not limited, and a wide range of publicly-known methods for producing a polycarbonate resin composition can be employed.

Specific examples thereof include a method in which the polycarbonate resin (A), the flame retardant (B) and the fluoropolymer (C) of the present invention, and other components, which are blended according to need, are mixed together in advance using, for example, a mixing machine such as a tumbler, a Henschel mixer and a super mixer, and then the mixture is melt-kneaded using a mixing machine such as a Bunbury mixer, a roller, a Brabender, a single screw kneading extruder, a twin screw kneading extruder and a kneader.

[Method for Molding Polycarbonate Resin Composition]

The polycarbonate resin composition of the present invention can be made into molded bodies with various forms. In particular, when using the polycarbonate resin composition of the present invention, it is possible to provide a thin-walled molded article having excellent flame retardance, which is difficult to be realized by conventional polycarbonate resin compositions. Examples of applications of the molded article of the present invention include electrical and electronic equipments, office automation equipments, information terminal devices, machine components, home appliances, vehicle components, building components, various containers, leisure goods/sundries and components for lighting equipments, etc. In particular, because of excellent flame retardance, the molded article of the present invention is suitably used for electrical and electronic equipments, office automation equipments, information terminal devices, home appliances, components for lighting equipments, etc. and nameplates, and particularly suitably used for electrical and electronic equipments, components for lighting equipments and sheet members. In particular, the polycarbonate resin composition of the present invention is suitably used for molding into a sheet or film, and a sheet or film having excellent thin-wall flame retardance with a small thickness unevenness is obtained.

The method for obtaining a sheet or film from the polycarbonate resin composition of the present invention is not particularly limited. For example, molding methods such as the melt extrusion molding method, the solution casting method, the blow molding method and the inflation molding method can be used. Among them, preferred is the extrusion molding method from the viewpoint of productivity. In one preferred embodiment, the method for producing a sheet or film includes a step of extrusion molding the polycarbonate resin composition.

In the present invention, a non-reinforced thermoplastic resin layer may be laminated on one or both of surfaces of the outer layer of the sheet or film made of the polycarbonate resin. Specifically, according to one embodiment of the present invention, a laminated sheet or film, which has a thermoplastic resin layer on at least one surface of the polycarbonate resin layer, is provided. By employing this embodiment, good surface smoothness, glossiness and impact resistance can be obtained, and when printing is made on the back surface of the non-reinforced layer, deep outer appearance can be obtained.

Further, the thermoplastic resin to be laminated may contain various additives. Examples of such additives include a stabilizer, an antioxidant, a mold release agent, an ultraviolet absorber, a stain pigment, an antistatic agent, a flame retardant, an impact strength modifier, a plasticizer, a dispersing agent and an antimicrobial agent. One type of such an additive for resin may be contained, or two or more types of such additives may be contained with any combination and any ratio.

Note that the "sheet" generally refers to a thin and flat product whose thickness is small considering the length and width thereof, and the "film" refers to a thin and flat product whose thickness is extremely small considering the length and width thereof, wherein the maximum thickness is arbitrarily limited, which is usually supplied in the form of a roll. However, in this specification, the "sheet" is not clearly distinguished from the "film", and these terms are used as the same meaning.

[Thickness of Film/Sheet]

The thickness of the film or sheet obtained from the polycarbonate resin composition of the present invention (polycarbonate resin layer in the case of a laminated body) is preferably 10 to 1000 μm, and more preferably 30 to 500 μm.

In one preferred embodiment, the flame retardant (B) includes a phosphorus-based flame retardant, and the thickness of the film or sheet is 30 to 200 μm. When employing this embodiment, excellent thin-wall flame retardance and reduced thickness unevenness can be attained.

In another preferred embodiment, the flame retardant (B) includes a halogen-based flame retardant, and the thickness of the film or sheet is 200 to 500 μm. When employing this embodiment, heat shrinkage after molding can be significantly reduced. The thickness is even more preferably 30 to 200 μm. The film or sheet obtained from the polycarbonate resin composition of the present invention has a small thickness unevenness.

<Flame Retardance of Film/Sheet>

The film or sheet obtained from the resin composition of the present invention has excellent flame retardance. Specifically, when it is evaluated by a method in accordance with the UL94/VTM burning test, it is evaluated as VTM-2 or better, preferably evaluated as VTM-1 or better, and more preferably evaluated as VTM-0. Note that the UL94/VTM burning test can be conducted by the method described in the Examples below.

EXAMPLES

Hereinafter, the present invention will be described in more detail by way of examples. However, the present invention is not limited to the below-described examples, and can be arbitrarily changed and then carried out without departing from the gist of the present invention.

<Measurement of Flow Value of Fluoropolymer>

The flow value of the fluoropolymer (C) was evaluated by reference to the method described in JIS K7210-1: 2014 Annex JA. For the measurement, a flow tester CFT-500EX manufactured by Shimadzu Corporation was used, a die having a hole diameter of 2.1 mm and a length of 8 mm was used, and the amount of molten resin discharged at a test temperature of 400° C. with a test force of 0.98 MPa and a preheating time of 500 sec was used as the flow value. Note that the evaluation is described as "PTFE flow value" in the tables.

<Measurement of Particle Diameter of Fluoropolymer>

The measurement was carried out using a laser diffraction type particle size distribution measuring device SALD-2300 equipped with a cyclone injection type dry measurement unit DS5 manufactured by Shimadzu Corporation. A sample cup was filled with a sample, and it was subjected to the measurement with a dispersing pressure of 0.5 MPa, a table rising rate of 10 mm/sec and a refractive index of 1.65 to 0.05i. The particle size distribution curve was made, and after that, the particle diameter at volume percentage of passing of 30% (30% particle diameter) was calculated. Note that the result is described as "30% particle diameter" in the tables.

<Measurement of Thickness (Film Thickness Distribution) of Resin Film>

The film thickness distribution of the resin film was measured using a contact type desk-top off-line thickness measurement device (TOF-5R) manufactured by Yamabun Electronics Co., Ltd. The thickness of the central portion of the film was measured at 140 points in total at 10 mm intervals along the flow direction (MD direction) at the time of extrusion molding, and the average value and the standard deviation of the film thickness were obtained to evaluate variation of the film thickness. Note that the evaluation is described as "average film thickness" and "film thickness standard deviation" in the tables. Regarding the variation of the film thickness (thickness unevenness), the case where the film thickness standard deviation is 0 μm or more and less than 4 μm can be judged as "good", and the case where it is 4 μm or more can be judged as "poor".

<Evaluation of Flame Retardance>

The flame retardance of the polycarbonate resin film was evaluated by a method according to the UL94/VTM burning test established by Underwriters Laboratories (UL, US) using a cut film (width: 50 mm×length: 200 mm×thickness: 50 μm). In this evaluation, based on the criteria shown in Table 1 below, the case judged as VTM-0 to VTM-2 was regarded as conforming, and the case where deformation (melt tearing) of a test piece at the time of flame contact exceeded the bench mark was regarded as non-conforming. Note that the evaluation is described as "UL94 flame retardance" in the tables.

(Evaluation Method)

(i) Preparation of Measurement Samples

Measurement samples were cut into the above-described size (width: 50 mm×length: 200 mm×thickness: 50 μm).

A sample left at 23° C. and 50% RH for 48 hours was referred to as Sample A, and a sample left at 70° C. for 168 hours and then cooled at 23° C. and at 20% RH or lower for 4 hours was referred to as Sample B. For each of them, one set consisting of 5 samples was prepared.

(ii) Measurement Method

A line was drawn on each sample at a position 125 mm away from the short side thereof in the direction parallel to the short side, and the sample was wound around a stick having a diameter of 12.7 mm in a manner such that the short side was in the vertical direction. The portion 75 mm or more above the 125 mm mark was fixed with a pressure sensitive tape and then the stick was pulled out. The upper end of the sample was closed in order to prevent the stack effect during the test. Next, each sample was set vertically, and an absorbent cotton was placed 300 mm below the sample. A Bunsen burner having a diameter of 9.5 mm and a length of flame of 20 mm as a heating source was placed in a manner such that the tube of the burner was positioned 10 mm below the lower end of the sample. The center portion of the lower end of the sample was brought into contact with blue flame for 3 seconds, and the burning time (t1) after the flame was moved away for the first time was measured. Next, immediately after burning stopped, flame contact for 3 seconds was performed again, and the burning time (t2) after the flame was moved away for the second time was measured. In addition, the presence or absence of a burning falling object which causes absorbent cotton ignition was observed. The above-described measurement was carried out for Sample A and Sample B, each of which consisted of a set of 5 samples.

Regarding each sample, the burning time (t1) after the flame was moved away for the first time was compared to the burning time (t2) after the flame was moved away for the second time, and the longer one (t1 or t2) was evaluated as "Maximum burning time of each sample". The total burning time of 5 samples (the total of t1+t2 of 5 samples) was evaluated as "Total burning time of 5 samples". The presence or absence of a burning falling object which causes absorbent cotton ignition was evaluated as the presence or absence of "cotton ignition due to dripping".

TABLE 1

|  | VTM-0 | VTM-1 | VTM-2 |
|---|---|---|---|
| Maximum burning time of each sample | 10 sec or less | 30 sec or less | 30 sec or less |
| Total burning time of 5 samples | 50 sec or less | 250 sec or less | 250 sec or less |
| Cotton ignition due to dripping | No | No | Yes |

<Measurement of Heat Shrinkage>

The measurement of shrinkage of a flame-retardant polycarbonate resin film due to aging was carried out as described below. A film cut into a size of 100 mm×100 mm×thickness: 0.25 mm was placed flatly on a wire netting of 100 mesh set in a hot air dryer at 160° C., thereby performing aging. After aging for 2 weeks, the film was put out therefrom, and conditions thereof were controlled under an environment at 23° C. and 50% RH for one day. After that, the size of the film along the flow direction (MD) was measured. The heat shrinkage ratio was calculated by dividing the difference between the in-plane size of the film before aging and that after aging (length) by the size before aging.

[Materials Used]

<Polycarbonate Resin (A)>

(a-1) "Iupilon (registered trademark)S-3000F" manufactured by Mitsubishi Engineering-Plastics Corporation, bisphenol A-type, viscosity-average molecular weight: 23,000

(a-2) "Iupilon (registered trademark) E-2000F" manufactured by Mitsubishi Engineering-Plastics Corporation, bisphenol A-type, viscosity-average molecular weight: 28,000

<Flame Retardant (B)>

(b-1) Phenoxyphosphazene ("Rabitle FP-110T" manufactured by Fushimi Pharmaceutical Co., Ltd.) (a compound, wherein m≥3 (main structure: cyclic trimer) and $R^5$ is a phenyl group in formula (IIa) above)

(b-2) Resorcinol bis-2,6-xylenyl phosphate ("PX-200" manufactured by Daihachi Chemical Industry Co., Ltd.)

(b-3) Brominated polycarbonate oligomer containing tetrabromobisphenol A ("Iupilon FR-53" manufactured by Mitsubishi Engineering-Plastics Corporation) (average degree of polymerization: pentamer)

(b-4) Potassium perfluorobutanesulfonate ("Megafac F-114" manufactured by DIC Corporation)

<Fluoropolymer (C)>

(c-1) "Teflon (registered trademark) TLP 10F-1" manufactured by Du Pont-Mitsui Fluorochemicals Co., Ltd.

(c-2) "Lubron L-2" manufactured by Daikin Industries, Ltd.

(c-3) "Lubron L-5F" manufactured by Daikin Industries, Ltd.

(c-4) "Polyflon FA-500H" manufactured by Daikin Industries, Ltd., polytetrafluoroethylene having fibril-forming ability The results regarding the 30% particle diameter and the PTFE flow value are shown in Table 2. Note that "Not flowed" regarding Polyflon FA-500H of c-4 in the table indicates that the flow value was less than $0.1 \times 10^{-3}$.

TABLE 2

| Items | Unit | c-1 TLP 10F-1 | c-2 L-2 | c-3 L-5F | c-4 FA-500B |
|---|---|---|---|---|---|
| PTFE flow value | $\times 10^{-3}$ cm$^3$/sec | 1.5 | 3.3 | 3.9 | Not flowed |

TABLE 2-continued

| Items | Unit | c-1 TLP 10F-1 | c-2 L-2 | c-3 L-5F | c-4 FA-500B |
|---|---|---|---|---|---|
| 30% particle diameter | μm | 2.9 | 3.1 | 3.5 | 500< |

<Other Additives (D)>
(d-1) Antioxidant: Pentaerythritol tetrakis[3-(3,5-di-tert-butyl-4-hydroxyphenyl)propionate] (ADK STAB "AO-60" manufactured by ADEKA Corporation)
(d-2) Antioxidant: Tris(2,4-di-tert-butylphenyl)phosphite (ADK STAB "2112" manufactured by ADEKA Corporation)

Examples 1-5 and Comparative Examples 1-3

<Production of Resin Pellet>
Compounding of a flame-retardant polycarbonate resin composition was carried out using each blending ratio in Tables 3 and 4. A twin screw extruder having one vent, TEX30α (C18 block, L/D=55) manufactured by The Japan Steel Works, Ltd. was used. Further, components were kneaded at a screw rotation speed of 200 rpm, at a discharge rate of 20 kg/hour, and at a barrel temperature of 280° C. (for a material in which a phosphorus-based flame retardant is blended) or 300° C. (for a material in which an organometallic salt-based flame retardant and a halogen-based flame retardant are blended). The molten resin extruded into a strand-like shape was rapidly cooled in a water bath and pelletized using a pelletizer.

<Production of Resin Film>
For molding a flame-retardant polycarbonate pellet into a sheet, a single screw extruder PSV-30 manufactured by Plaengi Co., Ltd. was used. Using a material in which the phosphorus-based flame retardant was blended, a film (width: 25 cm×length: 10 m×thickness: 0.05 mm) was obtained at a cylinder temperature of 280° C., at a die temperature of 300° C., at a roll temperature of 110° C. and at a screw rotation speed of 30 rpm. Further, using a material in which the organometallic salt-based flame retardant and the halogen-based flame retardant were blended, a film having a thickness of 0.25 mm was molded at a cylinder temperature of 300° C., at a die temperature of 300° C., at a roll temperature of 135° C. and at a screw rotation speed of 40 rpm.

The evaluation results are shown in Tables 3 and 4.

TABLE 4

| | Items | Symbols/ units | | Example 5 | Comparative Example 3 |
|---|---|---|---|---|---|
| Resin composition (% by mass) | (A) polycarbonate | (a-2) | E-2000F | 74.32 | 74.32 |
| | (B) flame retardant | (b-3) | FR-53 | 25 | 25 |
| | | (b-4) | F-114 | 0.1 | 0.1 |
| | (C) fluoropolymer | (c-2) | L-2 | 0.5 | |
| | | (c-4) | FA-500H | | 0.5 |
| | (D) other additives | (d-1) | AO-60 | 0.05 | 0.05 |
| | | (d-2) | 2112 | 0.03 | 0.03 |
| Evaluation results | Average film thickness | μm | | 253 | 252 |
| | Heat shrinkage ratio | % | | 5 | 15 |
| | UL94 flame retardance (thickness: 0.25 mm) | | | VTM-0 | VTM-0 |

As shown in Table 3, all the films produced from the polycarbonate resin compositions of Examples 1-4, each of which comprises the polycarbonate resin (A), the flame retardant (B) and the fluoropolymer (C), wherein the fluoropolymer (C) has a specific flow value, have excellent flame retardance. In particular, in Examples 1-4, the phosphorus-based flame retardant was used as the flame retardant (B), and it is indicated that when this is used in combination with the fluoropolymer (C) having a specific flow value, even a thin film having a thickness of about 50 μm has small thickness unevenness and excellent flame retardance. In addition, in Examples 1-4, heat shrinkage at the time of extrusion molding was suppressed, and the films having small thickness unevenness were successfully obtained.

Meanwhile, in Comparative Example 1 in which a fibrillated polyfluoroethylene having a flow value of less than $0.1 \times 10^{-3}$ cm$^3$/sec was used as the fluoropolymer (C), the results showed large thickness unevenness and poor flame retardance. It is inferred that the film thickness unevenness was increased because heat shrinkage of such a fibrillated polyfluoroethylene at the time of molding is large, and particularly because when it is used in combination with a phosphorus-based flame retardant, heat resistance (glass transition temperature) of a resin composition is reduced and the melt viscosity is reduced. Further, in Comparative Example 2 in which the fluoropolymer (C) was not contained, dripping easily occurred and it did not conform to the UL94 burning test standard.

As shown in Table 4, in Example 5 in which the fluoropolymer (C) having a specific flow value was used, heat shrinkage at the time of aging was suppressed. Meanwhile,

TABLE 3

| | Items | Symbols/ units | | Example 1 | Example 2 | Example 3 | Example 4 | Comparative Example 1 | Comparative Example 2 |
|---|---|---|---|---|---|---|---|---|---|
| Resin composition (% by mass) | (A) polycarbonate | (a-1) | S-3000F | 87.92 | 87.92 | 87.42 | 87.92 | 87.92 | 87.42 |
| | (B) flame retardant | (b-1) | FP-110T | 11.5 | 11.5 | | 11.5 | 11.5 | |
| | | (b-2) | PX-200 | | | 12 | | | 12.5 |
| | (C) fluoropolymer | (c-1) | TLP 10F-1 | 0.5 | | | | | |
| | | (c-2) | L-2 | | 0.5 | 0.5 | | | |
| | | (c-3) | L-5F | | | | 0.5 | | |
| | | (c-4) | FA-500H | | | | | 0.5 | |
| | (D) other additives | (d-1) | AO-60 | 0.05 | 0.05 | 0.05 | 0.05 | 0.05 | 0.05 |
| | | (d-2) | 2112 | 0.03 | 0.03 | 0.03 | 0.03 | 0.03 | 0.03 |
| Evaluation results | Average film thickness | μm | | 50 | 51 | 50 | 50 | 52 | 50 |
| | Film thickness standard deviation | μm | | 2.3 | 2.5 | 2.8 | 2.6 | 8.1 | 1.6 |
| | UL94 flame retardance (thickness: 0.05 mm) | | | VTM-0 | VTM-0 | VTM-0 | VTM-2 | Non-conforming | Non-conforming | in Comparative Example 3 in which a fibrillated polyfluoroethylene having a flow value of less than $0.1 \times 10^{-3}$ cm$^3$/sec was used, heat shrinkage at the time of aging was large. In particular, a halogen-based flame retardant was contained as the flame retardant (B) in Example 5 and Comparative Example 3, and Example 5 indicates that the heat shrinkage ratio can be significantly reduced by using a halogen-based flame retardant in combination with the fluoropolymer (C) having a specific flow value.

Thus, it was confirmed that excellent flame retardance can be imparted and heat shrinkage can be reduced by using the polycarbonate resin composition that contains the polycarbonate resin (A), the flame retardant (B) and the fluoropolymer (C) having a specific flow value.

The invention claimed is:

1. A polycarbonate resin composition containing 69 to 99.989% by mass of a polycarbonate resin (A), a flame retardant (B), and 0.05 to 0.5% by mass of a fluoropolymer (C), wherein the flame retardant (B) is selected from 5 to 25% by mass of a phosphorus-based flame retardant, 5 to 30% by mass of a halogen-based flame retardant, or 0.01 to 1% by mass of an organometallic salt-based flame retardant, wherein the flowability of the fluoropolymer (C) measured using a Koka flow tester at a measurement temperature of 400° C. with a measurement load of 0.98 MPa and a die hole diameter of 2.1 mm is $0.1 \times 10^{-3}$ cm$^3$/sec or more, wherein the fluoropolymer has a 30% particle diameter that is 3.2 μm or less, and wherein the 30% particle diameter is determined at the position of 30% from the smaller particle diameter side in a volume-based particle size distribution curve, wherein the polycarbonate resin (A) is a polycarbonate homopolymer of 2,2-bis(4-hydroxyphenyl)propane or a polycarbonate copolymer of 2,2-bis(4-hydroxyphenyl)propane and another aromatic dihydroxy compound.

2. The polycarbonate resin composition according to claim 1, wherein the phosphorus-based flame retardant is a phosphazene compound or a condensed phosphoric acid ester.

3. The polycarbonate resin composition according to claim 1, wherein the fluoropolymer (C) is a polymer or copolymer comprising a tetrafluoroethylene structure.

4. The polycarbonate resin composition according to claim 1, which is for a sheet or film.

5. A sheet or film, wherein the polycarbonate resin composition according to claim 1 is used.

6. A sheet or film, wherein the polycarbonate resin composition according to claim 1 is used, which has a thickness of 30 to 200 μm, wherein the flame retardant (B) contains the phosphorus-based flame retardant.

7. A sheet or film, wherein the polycarbonate resin composition according to claim 1 is used, which has a thickness of 200 to 500 μm, wherein the flame retardant (B) contains the halogen-based flame retardant.

8. A method for producing a sheet or film, which comprises extrusion molding the polycarbonate resin composition according to claim 1.

9. The polycarbonate resin composition according to claim 1, wherein the fluoropolymer (C) has a 30% particle diameter that is 2.9 μm or less.

10. The polycarbonate resin composition according to claim 1, wherein the fluoropolymer (C) has a number average molecular weight of 600,000 or less.

11. The polycarbonate resin composition according to claim 1, wherein the polycarbonate resin composition contains 8 to 20% by mass of the phosphorus-based flame retardant and 0.1 to 0.5% by mass of the fluoropolymer (C).

12. The polycarbonate resin composition according to claim 1, wherein the polycarbonate resin composition contains 8 to 12% by mass of the phosphorus-based flame retardant and 0.1 to 0.5% by mass of the fluoropolymer (C).

13. The polycarbonate resin composition according to claim 1, wherein the polycarbonate resin composition contains 10 to 30% by mass of the halogen-based flame retardant and 0.1 to 0.5% by mass of the fluoropolymer (C).

14. The polycarbonate resin composition according to claim 1, wherein the polycarbonate resin composition contains 20 to 25% by mass of the halogen-based flame retardant and 0.1 to 0.5% by mass of the fluoropolymer (C).

15. The polycarbonate resin composition according to claim 1, wherein the polycarbonate resin (A) consists of a polycarbonate homopolymer of 2,2-bis(4-hydroxyphenyl)propane or a polycarbonate copolymer consists of 2,2-bis(4-hydroxyphenyl)propane and another aromatic dihydroxy compound.

* * * * *